(12) United States Patent
Amari et al.

(10) Patent No.: US 10,967,966 B2
(45) Date of Patent: Apr. 6, 2021

(54) METHOD OF FABRICATING A ROTOR BLADE FILLER BODY, AND A ROTOR BLADE FILLER BODY COMPRISING AT LEAST ONE CELLULAR ASSEMBLY HAVING CLOSED CELLS

(71) Applicant: AIRBUS HELICOPTERS, Marignane (FR)

(72) Inventors: Andre Amari, La Chapelle en Serval (FR); Jacques Gaffiero, Paris (FR); Jean-Francois Piccone, Cabries (FR)

(73) Assignee: AIRBUS HELICOPTERS, Marignane (FR)

( * ) Notice: Subject to any disclaimer, the term of this patent is extended or adjusted under 35 U.S.C. 154(b) by 162 days.

(21) Appl. No.: 16/044,793

(22) Filed: Jul. 25, 2018

(65) Prior Publication Data
US 2019/0031329 A1    Jan. 31, 2019

(30) Foreign Application Priority Data
Jul. 28, 2017    (FR) ...................................... 1770806

(51) Int. Cl.
*B64C 27/473*    (2006.01)
*B29D 99/00*    (2010.01)
(Continued)

(52) U.S. Cl.
CPC ............ *B64C 27/473* (2013.01); *B29C 64/10* (2017.08); *B29D 99/0025* (2013.01);
(Continued)

(58) Field of Classification Search
CPC . B64C 27/473; B64C 27/463; B29D 99/0025; B29D 99/0028
(Continued)

(56) References Cited

U.S. PATENT DOCUMENTS

| 2,828,531 A * | 4/1958 | Bath ...................... B21D 53/78 29/889.6 |
| 2004/0048027 A1* | 3/2004 | Hayes ..................... B29C 64/40 428/53 |

(Continued)

FOREIGN PATENT DOCUMENTS

| EP | 2818404 A1 | 12/2014 |
| WO | 2004022319 A1 | 3/2004 |

OTHER PUBLICATIONS

French Search Report for French Application No. FR 1770806, Completed by the French Patent Office, dated Mar. 16, 2018, 8 pages.

(Continued)

*Primary Examiner* — David E Sosnowski
*Assistant Examiner* — Wesley Le Fisher
(74) *Attorney, Agent, or Firm* — Brooks Kushman P.C.

(57) ABSTRACT

A method of fabricating a filler body for a blade of a rotor. In addition, such a method comprises a succession of steps of adding material layer by layer, each step consisting in making a new layer of material on a preceding layer of material made in the preceding step, at least one of the steps consisting in making an openwork layer of material presenting a plurality of openings, the succession of steps of adding material layer by layer generating openwork layers of material, each having a closed outline, the respective closed outlines of the openwork layers of material touching mutually in pairs and forming a closed envelope of the filler body for the blade.

20 Claims, 3 Drawing Sheets

(51) Int. Cl.
  *B33Y 80/00* (2015.01)
  *B29C 64/10* (2017.01)
  *B64C 27/46* (2006.01)
  *B64C 11/26* (2006.01)
  *B29L 31/60* (2006.01)

(52) U.S. Cl.
  CPC ..... *B29D 99/0028* (2013.01); *B29D 99/0089* (2013.01); *B33Y 80/00* (2014.12); *B64C 11/26* (2013.01); *B64C 27/463* (2013.01); *B29L 2031/608* (2013.01); *B64C 2027/4736* (2013.01)

(58) Field of Classification Search
  USPC .......................................... 29/889.71, 889.72
  See application file for complete search history.

(56) References Cited

U.S. PATENT DOCUMENTS

| | | | | |
|---|---|---|---|---|
| 2012/0315456 A1* | 12/2012 | Scarpa | .................... | F16F 3/093 428/221 |
| 2013/0195671 A1* | 8/2013 | El-Wardany | ............ | F01D 5/286 416/229 R |
| 2013/0276461 A1* | 10/2013 | Propheter-Hinckley | ..................... | F01D 5/16 60/806 |
| 2014/0119930 A1 | 5/2014 | Thiagarajan et al. | | |
| 2015/0064016 A1* | 3/2015 | Cortequisse | .............. | B22F 5/04 416/230 |
| 2016/0115822 A1* | 4/2016 | Cortequisse | ............ | B22F 7/004 415/200 |
| 2016/0236406 A1* | 8/2016 | Schulte | ............... | B29C 66/5227 |
| 2017/0101871 A1* | 4/2017 | Tiedemann | ............. | F01D 5/186 |
| 2017/0204833 A1* | 7/2017 | Albert | ................... | F03D 1/0675 |
| 2017/0217088 A1* | 8/2017 | Boyd, IV | .............. | B29C 64/106 |
| 2019/0032491 A1* | 1/2019 | Nissen | .................. | B29C 64/386 |

OTHER PUBLICATIONS

Nattapon Chantarapanich et al. "Fabrication of three-dimensional honeycomb structure for aeronautical applications using selective laser melting : a preliminary investigation", Rapid Prototyping Journal, vol. 6, No. 6, Oct. 20, 2014, pp. 551-558, XP055199459, 9 pages.

Korean Notice of Preliminary Rejection dated Apr. 27, 2020 (with English Translation), Application No. 10-2018-0087973, Applicant Airbus Helicopters, 10 Pages.

* cited by examiner

METHOD OF FABRICATING A ROTOR BLADE FILLER BODY, AND A ROTOR BLADE FILLER BODY COMPRISING AT LEAST ONE CELLULAR ASSEMBLY HAVING CLOSED CELLS

CROSS-REFERENCE TO RELATED APPLICATIONS

This application claims priority to French patent application No. FR 1770806 filed on Jul. 28, 2017, the disclosure of which is incorporated in its entirety by reference herein.

BACKGROUND OF THE INVENTION

(1) Field of the Invention

The present invention relates to the field of methods of fabricating a filler body for a rotor blade. Such a filler body for a blade may be used in particular as part of a blade for a main rotor and/or a tail rotor of a rotorcraft or of any rotary wing, such as that of a multi-rotor drone or indeed a propeller, in particular.

Once made, such a filler body is then generally covered in a composite reinforcing material comprising at least one woven ply impregnated with a resin matrix or a mineral matrix or indeed a metal matrix serving as a binder between the various fibers of the woven ply(ies), with two or more plies constituting a laminate, by definition.

In addition, the invention also relates to a filler body for a rotor blade that comprises at least one cellular assembly having closed cells.

2) Description of Related Art

In known manner, filler bodies for rotorcraft blades may be made of polyurethane foams, for example, or indeed of so-called "honeycomb" structures, e.g. based on impregnated card or on paper covered in varnish, on resin impregnated Kevlar, on expanded aluminum, or indeed on extruded plastics material, such as polyurethane, in particular. Furthermore, as described in Document WO 2004/022319 and in the publication of Nattapon Chantarapanich et al "Fabrication of three-dimensional honeycomb structure for aeronautical applications using selective laser melting: a preliminary investigation" published on Oct. 20, 2014 in the Rapid Prototyping Journal (XP055199459), such so-called "honeycomb" structures may also be built up layer by layer, by additive fabrication methods.

Nevertheless, regardless of the fabrication method used, such filler bodies then form a core that needs to be arranged between two coverings (laminates, metal, . . . ) that are impregnated with a matrix. For example, one such material is known under the name Nomex®, a trademark registered by Dupont de Nemours. It is made up of sheets fabricated from aramid fibers, those sheets also be impregnated with a phenolic resin.

By way of example, the density of honeycomb structures may be of the order of 25 kilograms per cubic meter ($kg/m^3$), while the density of polyurethane foams lies more in the range 65 $kg/m^3$ to 120 $kg/m^3$.

A sandwich made in this way by a bottom covering, a filler body, and a top covering can then enable a rotorcraft blade to be made that presents considerable bending strength and also great lightness because of a void fraction close to 95%.

Nevertheless, given the geometrical configuration of honeycomb structures, such filler bodies present mechanical characteristics in compression that differ greatly along the three axes of a rectangular reference frame comprising a transverse axis X oriented along the chords of the aerodynamic profiles of blade sections, a longitudinal axis oriented substantially spanwise relative to the blade (generally the direction in which the honeycombs are expanded), and an elevation axis Z perpendicular both to the transverse axis X and to the longitudinal axis Y.

Specifically, honeycomb structure filler bodies have characteristics of considerable compression strength along the elevation axis Z, which may correspond to the direction of the generator lines of the cells of the honeycomb. Such positioning of the cells of honeycombs is advantageous in particular for countering compression forces that might lead to flattening of the aerodynamic profiles of sections along this elevation axis Z.

In contrast, along the other two axes, i.e. the transverse axis X and the longitudinal axis Y, the compression strength of honeycomb structures is smaller. Such a characteristic is then penalizing, and at very least constraining, when it comes to positioning other structural components of the blade, in particular components such as spars, torsion box sections, or ribs, in particular, that need to be arranged in the blade prior to positioning the reinforcing woven ply that forms all or part of the outer shell of the blade and prior to a stage of molding the outer shell.

Specifically, during the stage of molding a rotorcraft blade, once all of the elements are arranged in the mold in the non-polymerized state, and the mold is closed, large compression forces appear in the section of the blade and thus in its filler body, and during polymerization, these forces tend to deform and move the various structural components of the blade along the three axes X, Y, and Z. Movements of subassemblies such as torsion box sections can then be imparted along the transverse axis X, e.g. towards a trailing side of the aerodynamic profile of the sections, in particular because of the poor compression strength (or more exactly compression stiffness) along the transverse axis X of the honeycomb structures forming the filler body of the blade.

Furthermore, the top and bottom faces of the honeycomb structures are open by construction and are subsequently covered by the woven reinforcing plies. Because of this discontinuity of support which is localized at sharp edges, and because of the intrinsic flexibility of woven reinforcing plies, a localized phenomenon of collapse at the center of each honeycomb cell is then observed after fabrication or operation, which phenomenon gives rise to a multiply-facetted surface effect like a golf ball. This localized degradation in the shape of the blade due to honeycomb filler bodies is also known as "telegraphing" by analogy with the paths followed by cables suspended between pylons.

Such a surface effect then requires major finishing operations such as filling and sanding in order to obtain a satisfactory surface state. The cost and the technical characteristics of blades as formed in this way are then penalized by these limitations of honeycomb structures.

Although filler bodies made of foam, e.g. of polyurethane type, do not present such drawbacks, they present densities that are generally greater than those of honeycomb structures, i.e. densities that are typically greater than 65 $kg/m^3$. Furthermore, their fabrication cost is relatively high since it is necessary initially to cast blocks of foam, to stove them, and to descale them, and then subsequently to machine complex three-dimensional shapes in these blocks constituting the filler bodies per se.

Finally, since foams include by way of example organic compounds such as polyols or iso-cyanates, and since there can be large amounts of scrap, which can be up to 80% not recyclable, because of its association with the method of fabricating such filler bodies, such foams have a significant ecological impact.

BRIEF SUMMARY OF THE INVENTION

An object of the present invention is thus to propose a method of fabricating filler bodies for rotor blades that makes it possible to avoid the above-mentioned limitations. In addition, the method of fabrication enables filler bodies to be made without scrap material.

Furthermore, filler bodies made in this way are very light in weight and have stiffness and compression strength characteristics that can be substantially similar along the three axes X, Y, and Z.

The invention thus provides a fabrication method for fabricating a filler body of a rotor blade.

Such a fabrication method comprises a succession of steps of adding material layer by layer, each step consisting in making a new layer of material on a preceding layer of material made in the preceding step, at least one of the steps consisting in making an openwork layer of material presenting a plurality of openings.

In other words, such a fabrication method makes it possible to make a filler body in three dimensions, i.e. along the axes X, Y, and Z, and may involve steps of three-dimensional printing by depositing a material by means of a nozzle onto a support, or by stereo lithography using a laser serving either to polymerize locally a bath of substance in the liquid phase, or else to sinter selectively a substance in the powder phase. Such a method of fabricating a blade filler body then corresponds to methods known as additive layer manufacturing (ALM).

Such a method may serve in particular to give the filler body densities that vary in three dimensions along the axes X, Y, and Z. Consequently, for each cross-section in an XZ plane of a filler body, the exact position of the center of gravity of that section in the XZ plane of the filler body of the blade can be determined while designing the internal structure of the filler body for the blade, with the internal structure being obtained, for example, by successively superposing different completely openwork layers of material along the elevation axis Z.

Furthermore, independently of being able to adjust the density of filler bodies, such a fabrication method also makes it possible likewise to adjust the stiffness and/or the mechanical strength characteristics of the blade, in particular in terms of buckling or compression.

Furthermore, the succession of steps of adding material layer by layer generates openwork layers of material, each having a closed outline, such respective closed outlines of the openwork layers of material touching mutually in pairs and forming a closed envelope of the filler body for the blade.

Consequently, the succession of steps makes it possible to generate directly a filler body that has an envelope with an outside surface that is substantially smooth. Such a method thus makes it possible to avoid the "telegraphing" phenomenon that is observed when covering a filler body with one or more woven reinforcing plies or a laminate, and consequently serves also to eliminate additional steps of filling and sanding.

According to the invention, such a fabrication method is remarkable in that the succession of steps of adding material layer by layer generates openwork layers of material, each having a plurality of geometrical shapes arranged within the closed outline and making it possible to define the plurality of openings of the openwork layer of material, the pluralities of respective geometrical shapes in the openwork layers of material touching mutually in pairs and forming a cellular lattice of closed cells arranged inside the closed envelope of the filler body of the blade.

In other words, the cellular lattice makes it possible, e.g. by modifying the geometrical shapes in planes parallel to the XY plane, to modify the density, the stiffness, and/or the mechanical strength characteristics of the filler body. Naturally, the density, the stiffness, and the mechanical strength characteristics of the filler body are modified by adapting the number, the size, and the shape of the closed cells making it up and also the thickness of the geometrical shapes used for generating the closed cells.

Furthermore, and in a first implementation, said succession of steps of adding material layer by layer may generate openwork layers of material made out of the same substance.

Nevertheless, in an advantageous second implementation, said succession of steps of adding material layer by layer may equally well generate openwork layers of material made of at least two substances distinct from each other.

These at least two distinct substances may thus advantageously have mutually distinct densities, and stiffnesses and/or mechanical strength characteristics, in particular in terms of buckling or of compression that are mutually different in order to adapt the positioning of the center of gravity or mass of the blade, and/or the stiffness and/or the overall mechanical characteristics of the blade as formed in this way with such a filler body.

Under such circumstances, and in a first variant of the invention, the succession of steps of adding material layer by layer may generate at least two openwork layers of material distinct from each other, a first layer being formed out of a first substance and a second layer being formed out of a second substance distinct from the first substance.

In this first variant, it may then be envisaged by way of example to make the layers out of a first substance in the proximity of a middle portion of the filler body along the elevation axis Z, and to make other layers out of a second substance starting from some predetermined distance along the elevation axis Z away from that middle portion. In addition, such a middle portion of the filler body may form a warped surface in which the chords of the various aerodynamic profiles of sections of a blade made out of such a filler body are inscribed.

It may thus be envisaged that the first substance close to the middle portion possesses density greater than the second substance spaced apart from the middle portion. Such a method may be performed using a three-dimensional printer machine having at least two print heads, each head serving to print using a predetermined substance.

In a second variant of the invention, the succession of steps of adding material layer by layer may generate at least one openwork layer of material made out of the at least two substances that are distinct from each other.

Under such circumstances, it can then be envisaged to modify the density of the material of the filler body in a given plane parallel to the XY plane and to do so within the same layer of material. At least two printer heads may then be employed simultaneously for the same layer of material.

The first print head may thus print a first zone situated in a plane parallel to the XY plane while a second print head may print, e.g. simultaneously, a second zone also situated in the same plane parallel to the XY plane.

The present invention also provides a filler body for a blade of a rotor, the filler body comprising at least one cellular lattice of closed cells.

Such a filler body is remarkable in that it is made by a fabrication method as described above and in that it has a closed envelope, the closed envelope covering the entire cellular lattice.

In other words, such a filler body is made using an ALM type fabrication method, i.e. a method comprising a succession of steps of adding material layer by layer, each step consisting in making a new layer of material on a preceding layer of material made during the preceding step.

Furthermore, the closed envelope may be smooth and continuous so as to avoid the "telegraphing" phenomenon when covering the filler body in one or more woven reinforcing plies or laminates, and can consequently avoid additional steps of filling and sanding.

Advantageously, the cellular lattice may be made up of cells each having at least four faces, each face of these cells being formed by a respective polygon having at least three sides.

In other words, the cells may form polyhedra selected from the group comprising in particular tetrahedra, hexahedra, octahedra, dodecahedra, and icosahedra.

In practice, the cellular lattice may include at least two groups of cells that are distinct from one another.

Specifically, the shape and the size of the cells may vary as a function of their respective locations within the filler body.

In a first embodiment of the invention, the cellular lattice may comprise a first group of cells for which each of the at least three sides presents a respective first length, and a second group of cells for which each of the at least three sides presents a respective second length distinct from the first length.

Under such circumstances, it is the size of the cells that is modified between the first and second groups of cells. In addition, the larger the size of the cells, the smaller the density of the filler body in comparison with cells having the same shape, but of smaller size. In addition to modifying the density of the filler body, such a first embodiment likewise makes it possible to modify the stiffness and/or the mechanical strength characteristics of the filler body.

In addition, the first and second groups of cells may be arranged in a common plane parallel to the XY plane. Alternatively, or simultaneously, the first and second groups of cells may equally well be arranged along a common axis parallel to the elevation axis Z.

In a second embodiment of the invention, the cellular lattice may include a third group of cells for which each of the at least three sides presents a respective first thickness, and a fourth group of cells for which each of said at least three sides presents a respective second thickness distinct from said first thickness.

In this second embodiment, the thickness of the faces of the cells is modified between the third and fourth groups of cells. It is likewise immediately clear that for a given size and shape of cell, the greater the thickness of the faces, the greater the density of the resulting filler body. Independently of the density of the filler body, such a second embodiment likewise makes it possible to modify the stiffness and/or the mechanical strength characteristics of the filler body.

In addition, the third and fourth groups of cells may be arranged in a common plane parallel to the XY plane.

Alternatively or simultaneously, the third and fourth groups of cells may also be arranged along a common axis parallel to the elevation axis Z.

In a third embodiment of the invention, the cellular lattice may include a fifth group of cells for which each of the polygons forming the at least four faces presents a respective first shape and a sixth group of cells for which each of the polygons forming the at least four faces presents a respective second shape distinct from the first shape.

Consequently, the shape of the cells may be modified between the fifth and sixth groups of cells of the filler body. In addition, the greater the size of the polygons, the lower the density of the filler body, since it has less material per unit area in any given layer. As above, such a third embodiment likewise makes it possible to modify the stiffness and/or mechanical strength characteristics of the filler body.

In addition, the fifth and sixth groups of cells may be arranged in a common plane parallel to the XY plane. Alternatively or simultaneously, the fifth and sixth groups of cells may also be arranged along a common axis parallel to the elevation axis Z.

In a fourth embodiment of the invention, the cellular lattice may include a seventh group of cells made of a first substance, and an eighth group of cells made of a second substance distinct from the first substance.

Under such circumstances, the density of the substance selected for making the seventh and eighth groups of cells respectively serves directly to modify the density of the filler body, and also its stiffness and/or mechanical strength characteristics.

In addition, the seventh and eighth groups of cells may be arranged in a common plane parallel to the XY plane. Alternatively or simultaneously, the seventh and eighth groups of cells may also be arranged along an axis parallel to the elevation axis Z.

BRIEF DESCRIPTION OF THE DRAWINGS

The invention and its advantages appear in greater detail from the context of the following description of examples given by way of illustration and with reference to the accompanying figures, in which.

Elements present in more than one of the figures are given the same references in each of them.

DETAILED DESCRIPTION OF THE INVENTION

Figure 2:
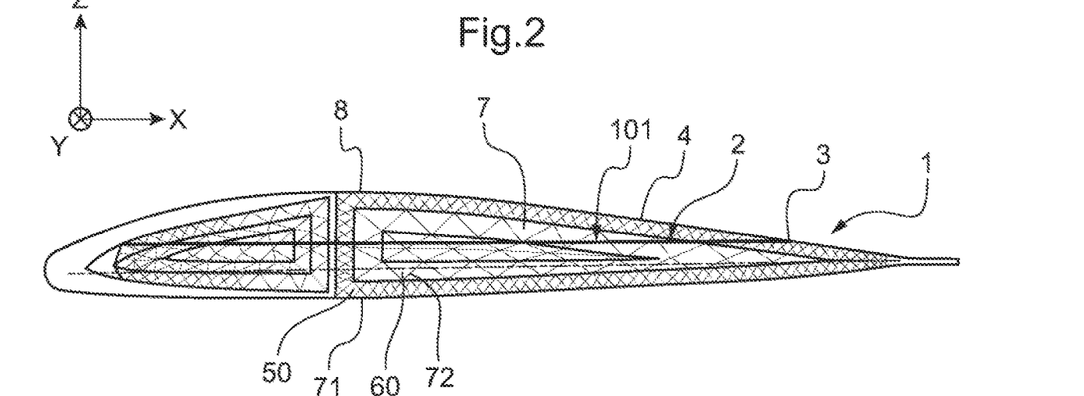
FIGS. 2, 3, and 5 are cross-section views of various embodiments of filler bodies in accordance with the invention.
Figure 3:
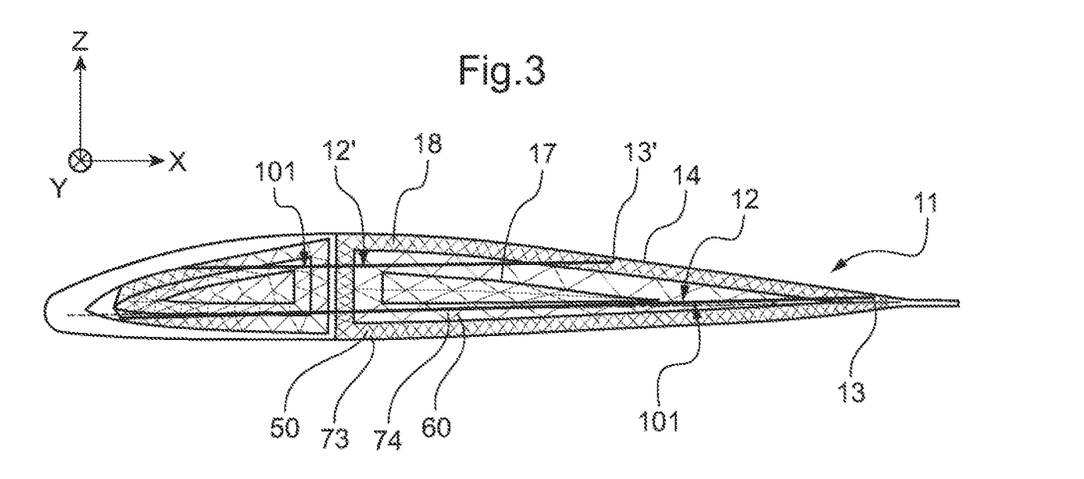
Figure 5:
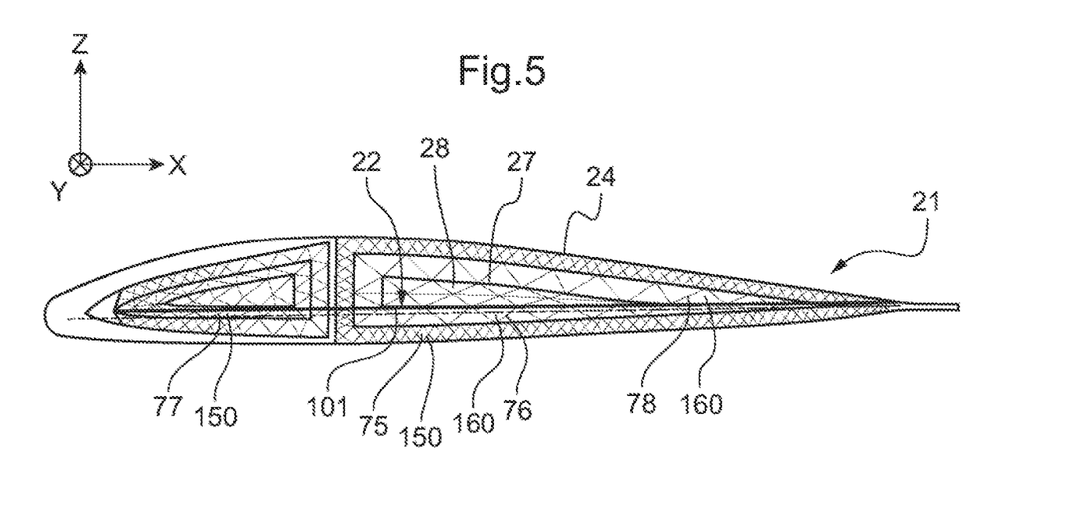

It should be observed that three mutually orthogonal axes X, Y, and Z are shown in FIGS. 2, 3, and 5.

The axis X is said to be transverse insofar as it extends transversely along a chord of the aerodynamic profiles of sections of a blade between a leading edge and a trailing edge, the blade including a filler body in accordance with the invention.

Another axis Y is said to be longitudinal and it extends perpendicularly relative to the axis X, substantially in the span direction of the blade.

Finally, a third axis Z is said to be in elevation and corresponds to the thickness dimensions of the aerodynamic profiles of sections of the blades between a suction side face and a pressure side face of the aerodynamic profile.

As mentioned above, the invention thus relates to a filler body for a rotor blade or a propeller blade, e.g. for a rotorcraft.

Figure 1:
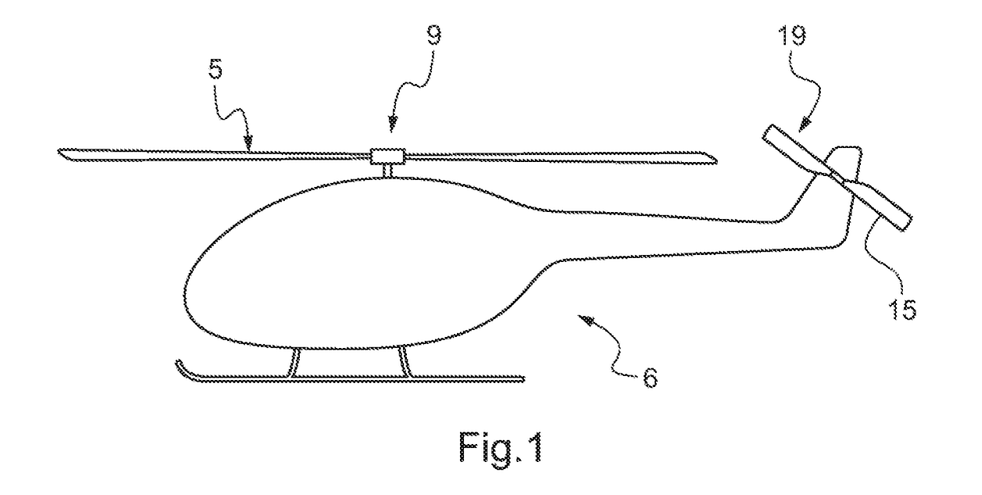
FIG. 1 is a diagrammatic side view of a rotorcraft fitted with blades, in accordance with the invention.

As shown in FIG. 1, such a filler body may be arranged in a blade 5 of a main rotor 9 and/or in a blade 15 of a tail rotor 19 of a rotorcraft 6.

As mentioned above, such a filler body is remarkable in that it is fabricated by an ALM type method by superposing layers of material on one another, e.g. by stereo lithography or by three-dimensional printing.

As shown in FIG. 2, and in a first embodiment, the filler body 1 is made by superposing openwork layers 2 of material, each including a plurality of geometrical shapes 7 inscribed in each of the planes parallel to the XY plane. In addition, each of these geometrical shapes 7 defines an opening 101 arranged in the openwork layers 2 of material.

Furthermore, these geometrical shapes 7 are defined by respective closed outlines 3 in each plane parallel to the XY plane and they make it possible to generate a closed three-dimensional envelope 4 for the filler body 1. For example, an openwork layer of material may be printed by moving a print head in a plane parallel to the XY plane, then moving the print head along the axis Z, and then printing a new openwork layer of material on the preceding layer parallel to the XY plane.

Such combined movement of the print head along the axes X, Y, and Z thus makes it possible to make a blade filler body that extends in three dimensions along the three axes X, Y, and Z.

Naturally, such an orientation of the layers is given by way of non-limiting indication. In addition, the openwork layers of material may also be arranged in planes parallel to the XZ plane and the print head may be moved along the axis Y between two operations of depositing an openwork layer of material.

Furthermore, such a closed envelope 4 thus contains a cellular lattice 8 made up of different closed cells 50, 60 extending in three dimensions along the three axes X, Y, and Z, and serving in particular to vary the density of the filler body 1 along the three axes X, Y, and Z, and also to vary the stiffness and/or the mechanical strength characteristics along the three axes X, Y, and Z of such a filler body 1.

More particularly, these different variations in density for the filler body 1 along the three axes X, Y, and Z and variations in the stiffness and/or mechanical strength characteristics along the three axes X, Y, and Z can be implemented by using different groups of cells 50, 60.

Figure 4A:
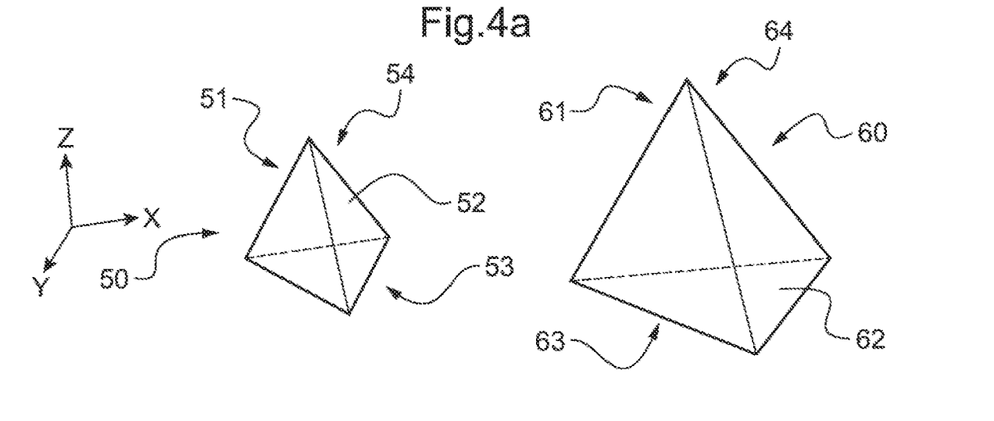
FIG. 4a comprises two perspective views of two distinct groups of cells forming a cellular lattice in a filler body in accordance with the invention.

Thus, a first group 71 of cells 50 may be formed by tetrahedra, i.e. having four faces 51-54, as shown in FIG. 4a, these faces 51-54 being made up by points defined by their coordinates along the axes X, Y, and Z. Likewise, a second group 72 of cells 60 may be made up of tetrahedra each having four faces 61-64 defined by other points with coordinates along the axes X, Y, and Z.

Figure 4B:
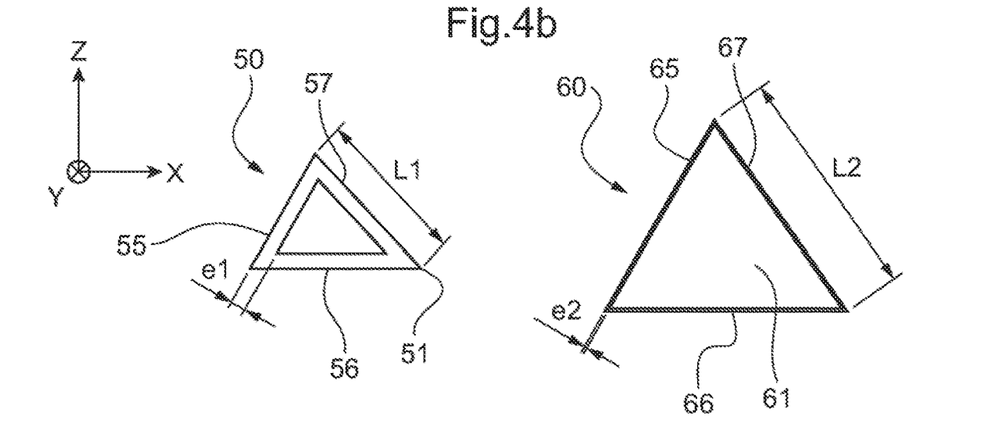
FIG. 4b shows projections onto a plane of two polygons illustrating the shape of two distinct groups of cells forming a cellular lattice of a filler body in accordance with the invention.

As shown in FIG. 4b, each face 51-54 of the cells 50 of the first group 71 may have sides 55-57, each having a respective length L1. Likewise, each face 61-64 of the cells 60 of the second group 72 may have sides 65-67, each having a respective length L2. Under such circumstances, the length L1 of the cells 50 is then distinct from the length L2 of the cells 60.

Likewise, and as shown in FIG. 3, the filler body 11 is made by superposing layers 12, 12' of material, each including a plurality of geometrical shapes 17 inscribed in each of the planes parallel to the XY plane. In addition, these geometrical shapes 17 are defined by respective closed outlines 13, 13' in each plane parallel to the XY plane, enabling a closed three-dimensional envelope 14 to be generated for the filler body 11 by moving the print head along the axis Z.

Such a filler body 11 may then have at least two layers 12 and 12' that are mutually distinct. A first layer 12 may then be made of a first substance, while the second layer 12' is made of a second substance distinct from the first substance.

Furthermore, each closed envelope 14 may likewise contain a cellular lattice 18 of different closed cells 50, 60 serving in particular to vary the density of the filler body 11 along the three axes X, Y, and Z and to vary the stiffness and/or the mechanical strength characteristics along the three axes X, Y, and Z of such a filler body 11.

As shown in FIG. 4b, each face 51-54 of the cells 50 of a third group 73 may have sides 55-57, each presenting a thickness e1. Likewise, each face 61-64 of the cells 60 of the third group 74 may have sides 65-67, each having a thickness e2. Under such circumstances, the thickness e1 of the cells 50 is distinct from the thickness e2 of the cells 60.

Figure 6:
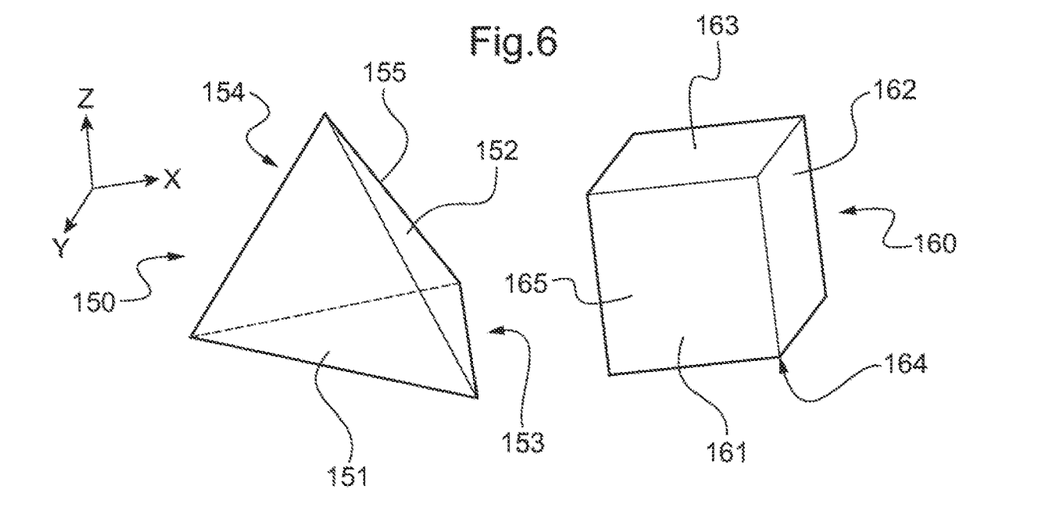
FIG. 6 shows two perspective views of two other distinct groups of cells forming a cellular lattice of a filler body in accordance with the invention.

As shown in FIGS. 5 and 6, the cellular lattice 28 includes a fifth group 75 of cells 150 in which the respective polygons forming the four faces 151-154 present a first shape 155 so as to produce a tetrahedron, and a sixth group 76 of cells 160 in which the respective polygons forming the six faces 161-164 present a second shape 165 suitable for forming a cube or a hexahedron.

In addition, the cellular lattice 28 may also have a seventh group 77 of cells 150 made of a first substance and an eighth group 78 of cells 160 made of a second substance distinct from the first substance.

Furthermore, a single layer 22 of material in the filler body 21 may thus be made up of two substances that are mutually distinct.

Consequently, such a cellular lattice 28 comprises different closed cells 150, 160 allowing in particular to vary the density of the filler body 21 along the three axes X, Y, and Z, and to vary the stiffness and/or the mechanical strength characteristics of such a filler body 21 along the three axes X, Y, and Z.

Figure 7:
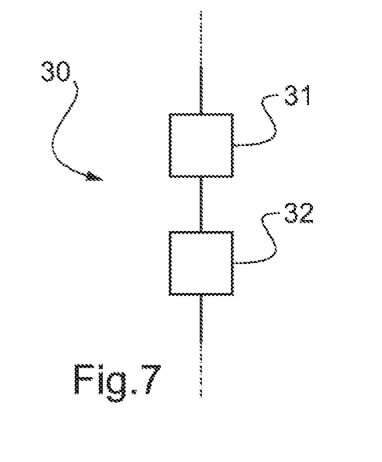
FIGS. 7 and 8 are two flow charts showing two methods of fabrication in accordance with the invention.
Figure 8:
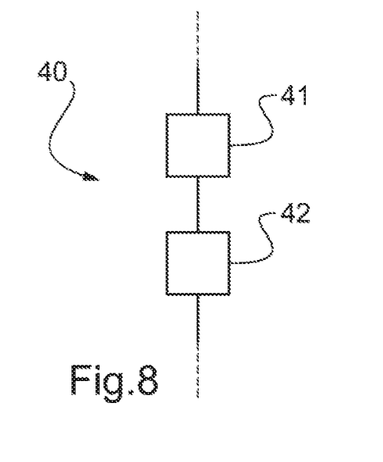

As shown in FIGS. 7 and 8, the invention also relates to a method of fabricating such a filler body 1, 11, 21. As mentioned above, the fabrication method 30, 40 comprises a succession of steps 31, 32, 41, 42 of adding material layer by layer, each step 32, 42 consisting in making a new layer of material on a preceding layer of material made in the preceding steps 31, 41.

In a first method of fabrication 30, as shown in FIG. 7, the succession of steps 31, 32 of adding material layer by layer may generate openwork layers 2 of material that are made of the same substance.

Nevertheless, in a second fabrication method 40, as shown in FIG. 8, the succession of steps 41, 42 of adding material layer by layer may generate openwork layers of material 12, 12', 22 made up of at least two substances that are distinct from each other.

Naturally, the present invention may be subjected to numerous variations and combinations as to its implementation. Although several embodiments are described, it will readily be understood that it is not conceivable to identify exhaustively all possible embodiments. It is naturally possible to replace any of the means described by equivalent means without going beyond the ambit of the present invention.

What is claimed is:

1. A fabrication method for fabricating a filler body of a blade for a rotor, the method comprising a succession of steps of adding material layer by layer, each step consisting in making a new layer of material on a preceding layer of material made in the preceding step, at least one of the steps consisting in making an openwork layer of material presenting a plurality of openings, the succession of steps of adding material layer by layer generating openwork layers of material, each having a closed outline, the respective closed outlines of the openwork layers of material touching mutually in pairs and forming a closed envelope of the filler body for the blade,
wherein the succession of steps of adding material layer by layer generates openwork layers of material, each having a plurality of geometrical shapes arranged within the closed outline and allowing to define the plurality of openings of the openwork layer of material, the pluralities of respective geometrical shapes in the openwork layers of material touching mutually in pairs and forming a cellular lattice of closed cells arranged inside the closed envelope of the filler body of the blade, wherein the cells have the form of a polyhedra selected from the group consisting of tetrahedra, hexahedra, octahedra, dodecahedra and icosahedra.

2. The fabrication method according to claim 1, wherein the succession of steps of adding material layer by layer generates openwork layers of material made out of the same substance.

3. The fabrication method according to claim 1, wherein the succession of steps of adding material layer by layer generates openwork layers of material made of at least two substances distinct from each other.

4. The fabrication method according to claim 3, wherein the succession of steps of adding material layer by layer generates at least two openwork layers of material distinct from each other, a first layer being formed out of a first substance and a second layer being formed out of a second substance distinct from the first substance.

5. The fabrication method according to claim 3, wherein the succession of steps of adding material layer by layer generates at least one openwork layer of material made out of the at least two substances that are distinct from each other.

6. A filler body for a blade of a rotor, the filler body comprising at least one cellular lattice of closed cells made by a fabrication method according to claim 1, wherein the closed envelope totally covers the cellular lattice.

7. The filler body according to claim 6, wherein the cellular lattice is made up of cells each having at least four faces each face of the cells being formed by a respective polygon having at least three sides.

8. The filler body according to claim 7, wherein the cellular lattice includes at least two groups of cells that are distinct from each other.

9. The filler body according to claim 8, wherein the cellular lattice comprises a first group of cells for which each of the at least three sides presents a respective first length L1, and a second group of cells for which each of the at least three sides presents a respective second length L2 distinct from the first length L1.

10. The filler body according to claim 8, wherein the cellular lattice includes a third group of cells for which each of the at least three sides presents a respective first thickness e1, and a fourth group of cells for which each of the at least three sides presents a respective second thickness e2 distinct from the first thickness e1.

11. The filler body according to claim 8, wherein the cellular lattice includes a fifth group of cells for which each of the polygons forming the at least four faces presents a respective first shape and a sixth group of cells for which each of the polygons forming the at least four faces presents a respective second shape distinct from the first shape.

12. The filler body according to claim 8, wherein the cellular lattice includes a seventh group of cells made of a first substance, and an eighth group of cells made of a second substance distinct from the first substance.

13. A fabrication method for fabricating a filler body of a blade for a rotor, the method comprising a succession of steps of adding material layer by layer, each step comprising making a new layer of material on a preceding layer of material, at least one of the steps comprising making an openwork layer of material presenting a plurality of openings, the succession of steps of adding material layer by layer generating openwork layers of material, each having a closed outline, the respective closed outlines of the openwork layers of material touching mutually in pairs and forming a closed envelope of the filler body for the blade,
wherein the succession of steps of adding material layer by layer generates openwork layers of material, each having a plurality of geometrical shapes arranged within the closed outline and allowing to define the plurality of openings of the openwork layer of material, the pluralities of respective geometrical shapes in the openwork layers of material touching mutually in pairs and forming a cellular lattice of closed cells arranged inside the closed envelope of the filler body of the blade, the closed cells having the form of a polyhedra selected from the group consisting of tetrahedra, hexahedra, octahedra, dodecahedra and icosahedra.

14. The fabrication method according to claim 13, wherein the succession of steps of adding material layer by layer generates openwork layers of material made out of the same substance.

15. The fabrication method according to claim 13, wherein the succession of steps of adding material layer by layer generates openwork layers of material made of at least two substances distinct from each other.

16. The fabrication method according to claim 15, wherein the succession of steps of adding material layer by layer generates at least two openwork layers of material distinct from each other, a first layer being formed out of a first substance and a second layer being formed out of a second substance distinct from the first substance.

17. The fabrication method according to claim 15, wherein the succession of steps of adding material layer by layer generates at least one openwork layer of material made out of the at least two substances that are distinct from each other.

18. A filler body for a blade of a rotor, the filler body comprising at least one cellular lattice of closed cells made by a fabrication method according to claim 13, wherein the closed envelope totally covers the cellular lattice.

19. The filler body according to claim 18, wherein the cellular lattice is made up of cells each having at least four faces each face of the cells being formed by a respective polygon having at least three sides, wherein the cellular lattice includes at least two groups of cells that are distinct from each other, and wherein the cellular lattice comprises a first group of cells for which each of the at least three sides presents a respective first length L1, and a second group of cells for which each of the at least three sides presents a respective second length L2 distinct from the first length L1.

20. A fabrication method for fabricating a filler body of a blade for a rotor, the method comprising a succession of steps of adding material layer by layer, each step comprising making a new layer of material on a preceding layer of material made in the preceding step, at least one of the steps comprising making an openwork layer of material presenting a plurality of openings, the succession of steps of adding material layer by layer generating superimposing openwork layers of material, each having a closed outline, the respective closed outlines of the openwork layers of material touching mutually in pairs and forming a closed envelope of the filler body for the blade, wherein the succession of steps of adding material layer by layer generates openwork layers of material, each having a plurality of geometrical shapes arranged within the closed outline and allowing to define the plurality of openings of the openwork layer of material, the pluralities of respective geometrical shapes in the openwork layers of material touching mutually in pairs and forming a cellular lattice of three dimensional closed cells arranged inside the closed envelope of the filler body of the blade, the closed cells having the form of a tetrahedra, hexahedra, octahedra, dodecahedra or icosahedra.

\* \* \* \* \*